(12) United States Patent
Lev-Tov et al.

(10) Patent No.: US 10,552,478 B1
(45) Date of Patent: Feb. 4, 2020

(54) IMAGE SEARCH USING INTERSECTED PREDICTED QUERIES

(71) Applicant: SHUTTERSTOCK, INC., New York, NY (US)

(72) Inventors: Manor Lev-Tov, Brooklyn, NY (US); Nathan Hurst, Seattle, WA (US)

(73) Assignee: SHUTTERSTOCK, INC., New York, NY (US)

( * ) Notice: Subject to any disclaimer, the term of this patent is extended or adjusted under 35 U.S.C. 154(b) by 313 days.

(21) Appl. No.: 15/393,016

(22) Filed: Dec. 28, 2016

(51) Int. Cl.
| | |
|---|---|
| G06F 16/58 | (2019.01) |
| G06F 16/248 | (2019.01) |
| G06F 16/583 | (2019.01) |
| G06F 16/9535 | (2019.01) |
| G06F 16/2457 | (2019.01) |

(52) U.S. Cl.
CPC ........ G06F 16/5866 (2019.01); G06F 16/248 (2019.01); G06F 16/24578 (2019.01); G06F 16/5838 (2019.01); G06F 16/9535 (2019.01)

(58) Field of Classification Search
CPC . G06F 16/335; G06F 16/5854; G06F 16/5866
USPC ........................................................ 707/706
See application file for complete search history.

(56) References Cited

U.S. PATENT DOCUMENTS

| | | | |
|---|---|---|---|
| 5,999,173 A | 12/1999 | Ubillos | |
| 6,523,026 B1* | 2/2003 | Gillis | G06F 16/3332 707/999.003 |
| 9,787,902 B1 | 10/2017 | Sebastien | |
| 2004/0220944 A1* | 11/2004 | Behrens | G06F 16/355 707/999.1 |
| 2010/0125568 A1* | 5/2010 | van Zwol | G06F 16/583 707/722 |
| 2011/0235902 A1* | 9/2011 | Chittar | G06F 16/532 382/162 |
| 2012/0124034 A1* | 5/2012 | Jing | G06K 9/6254 707/722 |
| 2012/0254076 A1* | 10/2012 | Yang | G06F 16/54 706/12 |

(Continued)

OTHER PUBLICATIONS

Zhou, et al., "Learning Deep Features for Discriminative Localization," Dec. 14, 2015, retrieved from http://cnnlocalization.csail.mit.edu/Zhou_Learning_Deep_Features_CVPR_2016 paper.pdf, 10 pages.

*Primary Examiner* — Shahid A Alam
(74) *Attorney, Agent, or Firm* — McDermott Will & Emery LLP

(57) ABSTRACT

A method for receiving a first user query from a user for searching an item, forming a first filter based on the first user query, and forming a first filtered item collection is provided. The method includes predicting a new query based on the first user query and a historical query log, forming a second filter for the new query, and applying the second filter to the first filtered item collection to form a second filtered item collection. Further, associating an item score to each of a plurality of items in the first and second filtered item collections, sorting the plurality of items in the first and second filtered item collections according to the item score associated to each of the plurality of items, and providing, to a user display, an item in the plurality of items in the first or second filtered item collections according to a sorting order.

20 Claims, 9 Drawing Sheets

(56) References Cited

U.S. PATENT DOCUMENTS

| | | | |
|---|---|---|---|
| 2014/0188931 A1* | 7/2014 | Smiling | G06F 16/90324 707/770 |
| 2014/0324913 A1* | 10/2014 | Morris | G06F 16/9535 707/796 |
| 2015/0220876 A1* | 8/2015 | Sethi | G06F 16/244 707/727 |
| 2015/0310010 A1* | 10/2015 | Brenner | G06F 16/48 707/730 |
| 2015/0324365 A1* | 11/2015 | Becker | G06F 16/24578 707/723 |
| 2015/0356187 A1* | 12/2015 | Konik | G06F 16/9038 707/706 |
| 2016/0210532 A1* | 7/2016 | Soldevila | G06K 9/6215 |
| 2016/0364625 A1* | 12/2016 | Lin | G06T 7/60 |
| 2017/0124400 A1 | 5/2017 | Yehezkel Rohekar | |

* cited by examiner

IMAGE SEARCH USING INTERSECTED PREDICTED QUERIES

BACKGROUND

Field

The present disclosure generally relates to an image search engine, and more particularly to methods and systems to provide image search results within an image database associated with a search engine including predicted queries.

Description of the Related Art

In the context of large multimedia databases, the ability of search engines to rapidly obtain relevant results for a user can be hampered by large computational overheads. Users are commonly required to include long text strings for a search query in order to reduce the number of items in a search result. Users become frustrated by inaccurate search results that can force users to browse through many pages of results, consequently reducing the advantage of an otherwise rich multimedia database.

SUMMARY

According to one embodiment of the present disclosure, a method is provided for receiving a first user query from a user for searching an item, forming a first filter based on the first user query, and forming a first filtered item collection including a plurality of items from the item database. The method also includes predicting a new query based on the first user query and a historical query log, forming a second filter for the new query, and applying the second filter to the first filtered item collection to form a second filtered item collection. The method further includes associating an item score to each of a plurality of items in the first filtered item collection and in the second filtered item collection, sorting the plurality of items in the first filtered item collection and in the second filtered item collection according to the item score associated to each of the plurality of items, and providing, for display to a user in a results panel, at least one item in the plurality of items in the first filtered item collection and in the second filtered item collection.

According to one embodiment of the present disclosure, a method is provided for placing a query for an image search in a user interface for a search engine and selecting a predicted query from a pull down menu in the user interface. The method further includes placing an additional term in the query to focus a search scope, providing a search command to the search engine, and selecting an image from a thumbnail in a results panel when the results panel includes a satisfactory search scope. Selecting a predicted query from a pull down menu in the user interface includes directing a pointing device to the predicted query in the pull down menu and activating the selection with the pointing device, and the method also includes re-ordering terms in a new query when the results panel does not include a satisfactory search scope.

According to some embodiments, a system is provided that includes one or more processors and a computer-readable storage medium coupled to the one or more processors, the computer-readable storage medium including instructions that, when executed by the one or more processors, cause the one or more processors to receive a first user query from a user for searching an item in an item database. The instructions causing the one or more processors further to form a first filter based on the first user query, form a first filtered item collection comprising a plurality of items from the item database, and predict a new query based on the first user query and a historical query log. The instructions further cause the one or more processors to form a second filter for the new query, apply the second filter to the first filtered item collection to form a second filtered item collection, and associate an item score to each of a plurality of items in the first filtered item collection and in the second filtered item collection. The computer-readable medium further includes instructions causing the one or more processors to sort the plurality of items in the first filtered item collection and in the second filtered item collection according to the item score associated to each of the plurality of items, and to provide, for display to a user in a results panel, at least one item from the plurality of items in the first filtered item collection and in the second filtered item collection.

According to some embodiments, a non-transitory, computer-readable medium stores instructions that cause a processor to perform a method including the steps of receiving a first user query from a user for searching an item in an item database, forming a first filter based on the first user query, and forming a first filtered item collection. In some embodiments, the instructions cause the processor to perform the steps of predicting a new query based on the first user query and a historical query log, forming a second filter for the new query, and applying the second filter to the first filtered item collection to form a second filtered item collection comprising a plurality of items from the item database. The instructions further cause the processor to perform the steps of associating an item score to each of a plurality of items in the first filtered item collection and in the second filtered item collection, sorting the plurality of items in the first filtered item collection and in the second filtered item collection according to the item score associated to each of the plurality of items, and providing, for display to a user in a results panel, at least one item in the plurality of items in the first filtered item collection and in the second filtered item collection.

In yet other embodiments, a system is provided that includes a means for storing commands and a means for executing the commands, causing the system to perform a method including the steps of receiving a first user query from a user for searching an item in an item database, forming a first filter based on the first user query, and forming a first filtered item collection comprising a plurality of items from the item database. In some embodiments, the commands cause the system to perform the steps of predicting a new query based on the first user query and a historical query log, forming a second filter for the new query, and applying the second filter to the first filtered item collection to form a second filtered item collection. The commands may further cause the system to perform the steps of associating an item score to each of a plurality of items in the first filtered item collection and in the second filtered item collection, sorting the plurality of items in the first filtered item collection and in the second filtered item collection according to the item score associated to each of the plurality of items, and providing, for display to a user in a results panel, at least one item in the plurality of items in the first filtered item collection and in the second filtered item collection.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
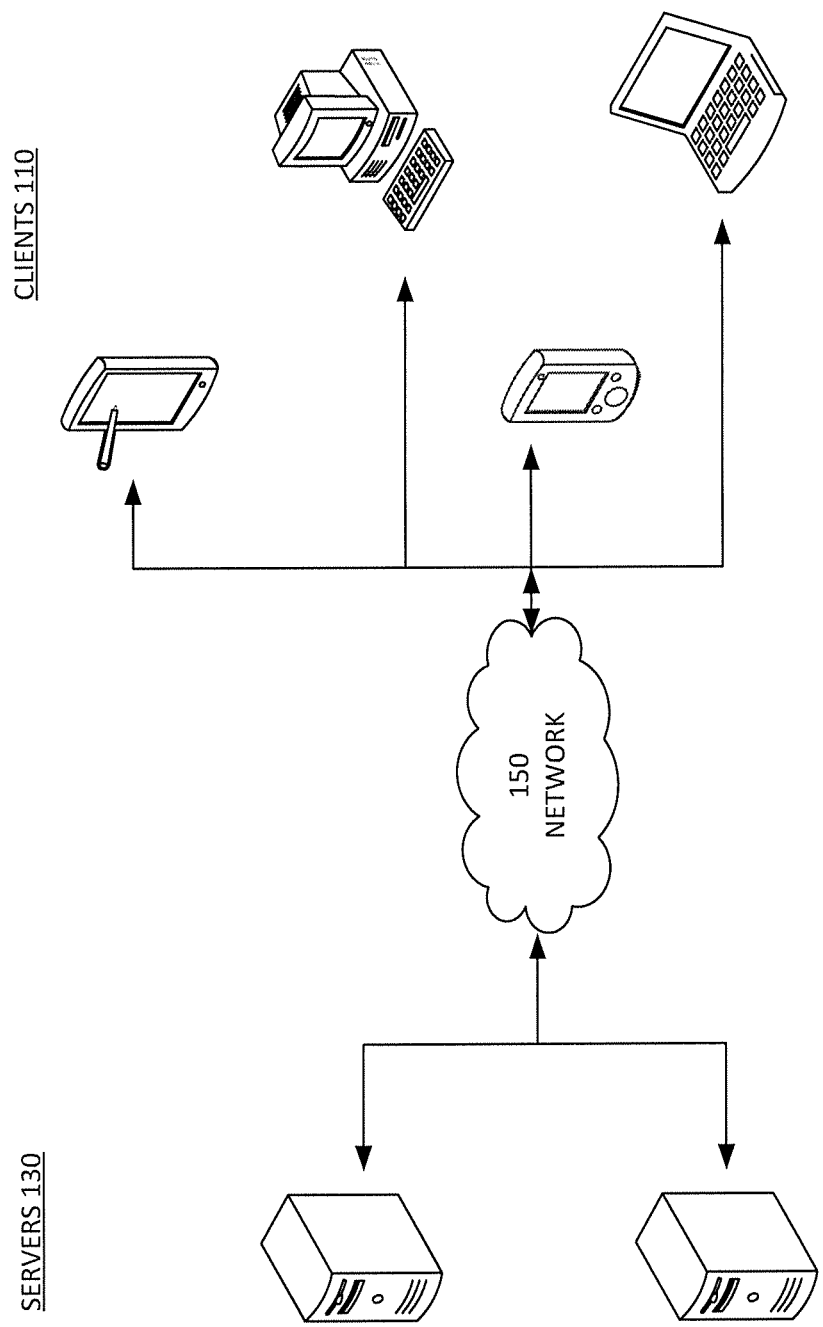
FIG. 1 illustrates an example architecture for an image search with intersected predicted queries suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and/or a label associated with an image for identifying the image.

A search engine as disclosed herein includes an ability to filter a collection of content items to those content items relevant to a search query, scoring these filtered results by relevancy, and sorting the results. In some embodiments, filtering and scoring can be combined as a single step. For example, the image results for over the query "woman in red dress" are expected to form a subset of the image results for the query "woman in dress." Accordingly, a search of the former query over the latter filter avoids redundancy and is therefore more efficient and better targeted. The filtering step can be computationally intensive because it involves scanning through the entire image collection. Accordingly, methods as disclosed herein limit the results retrieved to content items that are more relevant to the initial user query. Methods as disclosed herein improve the efficiency of a search engine for finding search results by simultaneously searching for multiple queries. Embodiments disclosed herein exploit the higher likelihood that a user will follow a query that is a refinement query of an initial user query, i.e. a refinement query that contains all, or most of the terms in the initial user query, with additional terms used as refinement.

The disclosed system addresses the problem of filtering results in a search engine in a large database of content items specifically arising in the realm of computer technology by providing a solution also rooted in computer technology, namely, by considering the inclusion of additional terms in an initial user query for a search engine, expanding the search scope to a plurality of predicted queries, and performing a more exhaustive and effective search with little to no computational overhead by pursuing multiple search threads simultaneously, or almost simultaneously.

The subject system provides several advantages including providing an extended and more efficient search scope for queries to a search engine. The system provides a machine learning capability where the system can learn from a content item such as prior search queries from one or multiple users to expand a search scope, thereby increasing the likelihood that the user will in fact select at least one or more results. Also, the system enables the user to more rapidly and efficiently interact with a search engine, improving user experience and satisfaction.

Embodiments as disclosed herein add a limited computational overhead by including a plurality of inter-related search threads that are executed almost simultaneously, in addition to performing a more robust search, resulting in providing the user with a more exhaustive and accurate set of search results.

The proposed solution further provides improvements to the functioning of the computer itself because it substantially reduces network usage (e.g., during an image search) while providing search results that are more likely to be relevant to the user.

Although many examples provided herein describe a user's search inputs being identifiable, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

Example System Architecture

FIG. 1 illustrates an example architecture 100 for an image search with intersected predicted queries suitable for practicing some implementations of the disclosure. The architecture 100 includes servers 130 and clients 110 connected over a network 150. One of the many servers 130 is configured to host a memory including instructions which, when executed by a processor, cause the server 130 to perform at least some of the steps in methods as disclosed herein. In some embodiments, the processor is configured to search and find multimedia data files including images, video, music, and the like using text queries input by a user through client device 110. Further, in some embodiments the processor in server 130 is configured to find predicted queries from an input user query (IUQ), and to search and find multimedia data files using the predicted search queries. Accordingly, one of the many servers 130 also hosts a collection of images, videos, and multimedia files. The collection of multimedia files can be searched using an image search engine (e.g., accessible through a web page or an application running on one of clients 110). Servers 130 can return images tagged with an image score to clients 110 in response to the input user query (IUQ). Moreover, in some embodiments the processor is configured to associate the IUQ with a predicted query string from a query stream log. For purposes of load balancing, multiple servers 130 can host memories including instructions to one or more processors and multiple servers 130 can host the collection of images.

Servers 130 may include any device having an appropriate processor, memory, and communications capability for hosting the collection of images and the image search engine. The image search engine is accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Example Automatic Video Summary System

Figure 2:
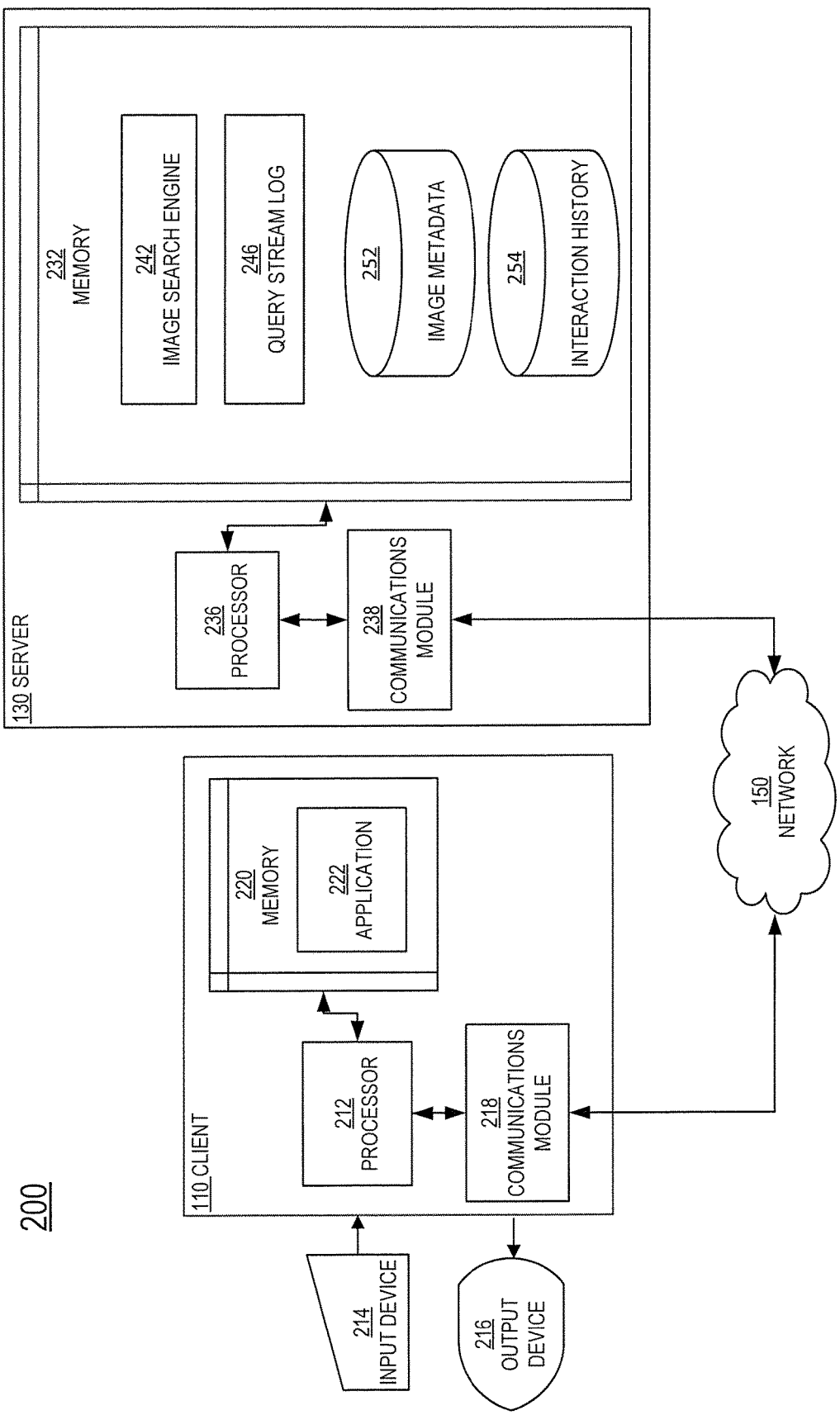
FIG. 2 is a block diagram illustrating an example server and client from the architecture of FIG. 1 according to certain aspects of the disclosure.

FIG. 2 is a block diagram 200 illustrating an example server 130 and client 110 in the architecture 100 of FIG. 1 according to certain aspects of the disclosure. Client 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Memory 232 includes an image metadata database 252 and an image search engine 242 for searching image metadata database 252. In one or more implementations, image metadata database 252 represents a database that contains, for each image, a mapping from an image identifier to a data file containing pixel data for the image (e.g., in jpeg format).

Server 130 includes a memory 232, a processor 236, and communications module 238. Moreover, in some embodiments processor 236 is configured to obtain a set of predicted queries from a query stream log 246, from an interaction history information in an interaction history database 254, and from an IUQ received from a user through a user interface for image search engine 242. The user interface is displayed for the user in an output device 216 of client 110. Query stream log 246 includes a plurality of query strings previously used by one or more users interacting with image search engine 242. In some aspects, processor 236, using query stream log 246 and executing instructions from memory 232, can provide a set of predicted queries from query stream log 246 to image search engine 242. Processor 236 may also display the set of predicted queries to the user in a pull down menu of the user interface.

The user may access image search engine 242 through an application 222 or a web browser installed in client 110. Image metadata database 252 can be, for example, a dataset associated with images corresponding to a number of style classes (e.g., about 25). The images may be paired with image vector information and image cluster information. The image vector information identifies vectors representing a large sample of images (e.g., about 50 million) and the image cluster information identifies the vectors in one or more clusters such that each of the cluster of images represents a semantic concept.

Although image metadata database 252 and image search engine 242 are illustrated as being in the same memory 232 of a server 130, in certain aspects the image metadata database 252 and image search engine 242 can be hosted in a memory of a different server but accessible by server 130 illustrated in FIG. 2.

Memory 232 also includes interaction history data 254. In certain aspects, processor 236 is configured to determine the interaction history data 254 by obtaining user interaction data identifying interactions with images from image search results that are responsive to search queries. For example, the processor 236 may determine that a user interacted with an image from a search result, such as, by clicking on the image, saving the image for subsequent access, or downloaded the image to a client (e.g., client 110), or the like. The processor 236 may keep track of the user interactions with a number of images over a given time period. The interaction history 254 may also include data indicating search behavior (and/or patterns) relating to prior image search queries.

Processor 236 is configured to execute instructions, such as instructions physically coded into processor 236, instructions received from software in memory 232, or a combination of both. The IUQ identifies a user search query in a given natural language. For example, the search query may be entered as an English term or combination of terms. A user of client 110 may use input device 214 to submit a search term or phrase via a user interface of application 222. The user interface may include an input section where the search term or phrase may be typed in, for example. The input section may include one or more controls to allow the user to initiate the image search upon receiving the search query. In some aspects, the image search may be initiated automatically upon receiving at least one search term (or at least the search phrase in part). As described herein, the natural language used in image search engine 242 is not limited to English, and the natural language can vary to include other natural languages depending on implementation.

A search query is then provisioned to image search engine 242 for initiating the image search through image metadata database 252. The IUQ is provided, for example, by the user accessing image search engine 242 over network 150 using application 222 in memory 220 on client 110. The user submits the IUQ using input device 214 of client 110. For example, the user may use input device 214 to enter a text-based search term or phrase. In response to the IUQ, a processor in client 110 transmits the search query over the network 150 using communications module 218 of client 110 to communications module 238 of server 130.

Processor 236, upon receiving the IUQ, submits a search request to image search engine 242. In some embodiments, processor 236 receives an identification of a plurality of images from image metadata database 252 that are responsive to the IUQ and also to the set of predicted queries. The plurality of images from image metadata database 252 may be sorted according to an image score (e.g., using interaction history database 254) indicating a probability of a user interaction for each image (e.g., the probability of a user clicking a thumbnail associated with one of the images). Processor 236 may then provide the listing of images to application 222 over network 150 for display by output device 216. The listing of images may include a plurality of thumbnails in a results panel of the user interface in output device 216.

Figure 3:
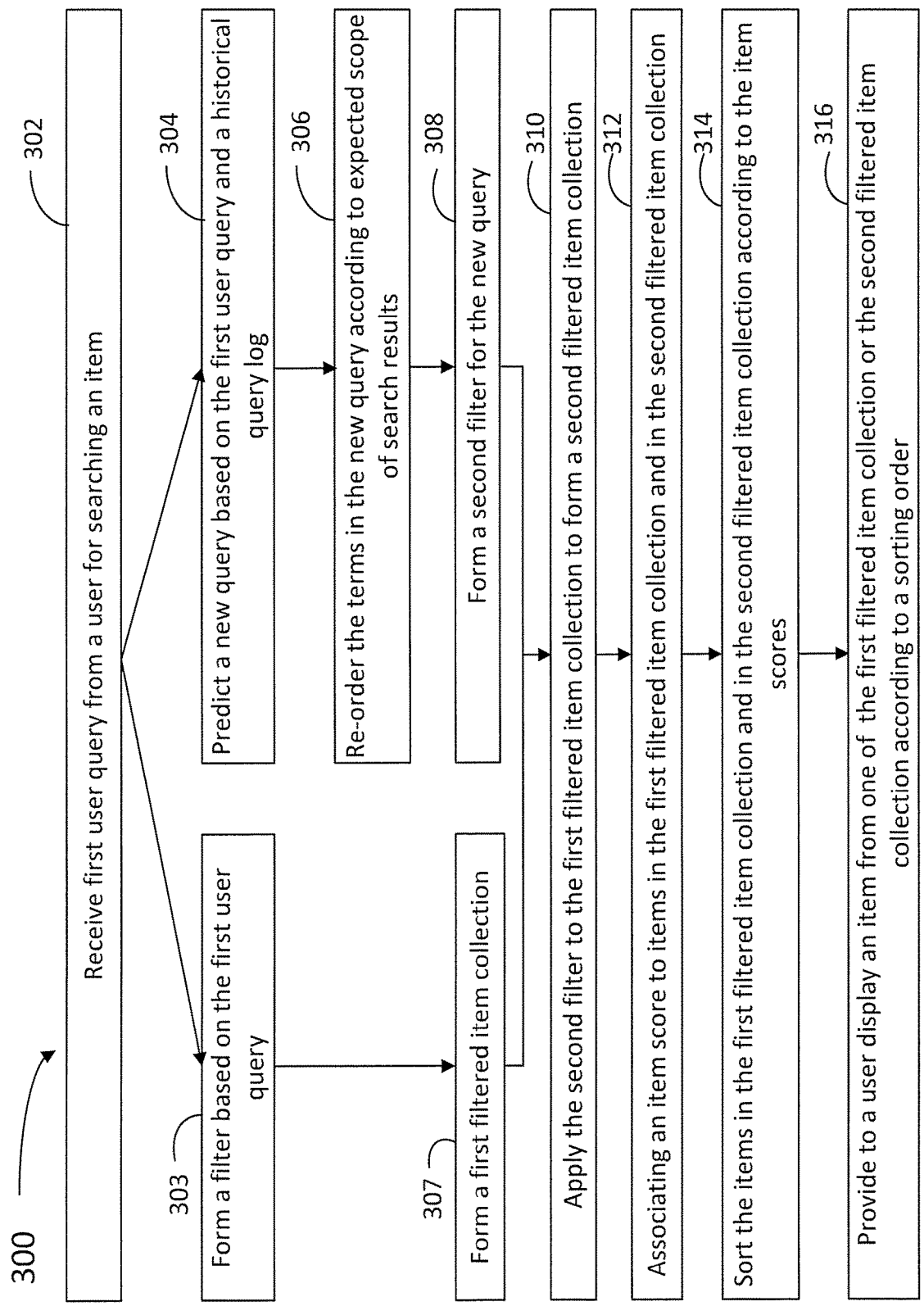
FIG. 3 is a flow chart illustrating steps in a method for image search using intersected predicted queries.

FIG. 3 is a flow chart illustrating steps in a method 300 for image search using intersected predicted queries. Method 300 may be performed at least partially by any one of network servers hosting a collection of images, videos, and multimedia files (e.g., images and video clips), while communicating with any one of a plurality of client devices (e.g., any one of servers 130 and any one of clients 110). The client devices may be handled by a user, wherein the user may be registered to a private account with the server, or may be a visitor to the server website or logged in a server application installed in the client device. At least some of the steps in method 300 may be performed by a computer having a processor executing commands stored in a memory of the computer (e.g., processors 212 and 236, memories 220 and 232). Further, steps as disclosed in method 300 may include retrieving, editing, and/or storing files in a database that is part of, or is communicably coupled to, the computer, using, inter-alia, an image search engine (e.g., image search engine 242). The database may include any one of an image database, a query stream log and an interaction history database (e.g., image database 252, query stream log 246 and interaction history database 254). Methods consistent with the present disclosure may include at least some, but not all of the steps illustrated in method 300, performed in a different sequence. Furthermore, methods consistent with the present disclosure may include at least two or more steps as in method 300 performed overlapping in time, or almost simultaneously.

Step 302 includes receiving a first user query. In the present disclosure, the input is a user query, which may be referred to as the initial user query (IUQ). When step 302 is completed, steps 303 and 304 may be performed in parallel, simultaneously, or almost simultaneously, as follows.

Step 303 includes forming a filter based on the first user query. As with a standard search system, our disclosure then filters the entire collection by the IUQ. The result of this filtering step may be recognized as the IUQ filter result (IUQFR). Filter all items to trim down collection (most computationally expensive). In some embodiments, step 303 includes storing the results of the filter in a cache memory (e.g., in memory 232) to be accessed further along in the process.

Step 304 includes predicting a new user query based on the first user query and a historical log. In some embodiments, step 304 includes determining an additional term for a search based on a predicted new query. In some embodiments, step 304 includes predicting the R most likely subsequent queries given the IUQ (where R is a pre-selected integer). For each new query determine the difference with the first user query in terms of the words added to the new query relative to the first user query. In some embodiments, step 304 includes matching at least a portion of the new query with at least a portion of the first user query and a portion of a query from the historical query log.

In some embodiments, step 304 includes re-ordering a plurality of terms in the new user query according to an expected scope of search results for the new user query. In some embodiments, step 304 includes forming a third filter for the new user query, and forming a third filtered item collection by applying the third filter to the first filtered item collection. In some aspects, the third filtered item collection and the second filtered item collection do not overlap.

Step 306 includes re-ordering the terms in the new user query according to the expected scope of the search results. In some embodiments, step 306 includes retaining filtered and scored results for each term step in the original query: "new york": "new" "york." Step 306 may include choosing the ordering of the terms filtered to increase the number of predicted results (e.g., altering the sequence "new york," and "york new").

Accordingly, step 306 provides the advantage of increasing the universe of possible predictions. In some embodiments, step 306 may include sorting the order of the terms in a query according to the expected return in number of search items: terms with smaller return are placed first. In some embodiments step 306 includes re-ordering the terms weighting more heavily in favor of sequences with more likely predictions. For example, the query "new york" is expected to return many more likely predictions relative to the query "york city," and step 306 may favor the foregoing ordering over the latter.

Step 307 includes forming a first filtered item collection. The search engine stores IUQFR in the memory. In some embodiments, step 307 includes applying the first filter to a plurality of image files stored in an image database.

Step 308 includes forming an additional filter for the new query (e.g., using the first filtered item collection). In some embodiments, step 308 includes performing a plurality of new predicted queries simultaneously or almost simultaneously because there is little to no overlapping between the search results for different predicted queries. This substantially reduces the latency overhead of the intersected predicted search as disclosed herein.

Step 310 includes applying the additional filter to the filtered item collection to form an additional filtered item collection. In some embodiments, step 310 includes applying the second filter to the first filtered item collection.

Step 312 includes associating an item score to the items in the first filtered item collection and in the additional filtered item collection. Scoring items according to relevance. In some embodiments, step 312 includes associating a probability to the one of the plurality of items that a user clicks on a thumbnail associated with the one of the plurality of items based on an interaction history information and a relevance feedback information. In some embodiments, step 312 includes finding a correlation between the first user query and an interaction history information associated with the user.

Step 314 includes sorting the items in the first filtered item collection and in the additional filtered item collection according to the item scores. In some embodiments, step 314 includes sorting the results by relevance to the query.

Step 316 includes providing a response to the first user query. In some embodiments step 316 includes forming a data structure. The results of each of the predicted query retrievals as well as the IUQFR are combined into a single result set. The data structure of the result set is a set of sets: One inner set for each predicted query and the IUQ. Each inner set contains the query and a sorted list of results, as with a standard search system. The resulting plurality of result sets can then be used to provide the user with instantaneous result to his/her likely next query by displaying them in the results panel, as the user hovers a pointing device over links, with updated results as suggestions in search textbox, or any other display option.

Figure 4:
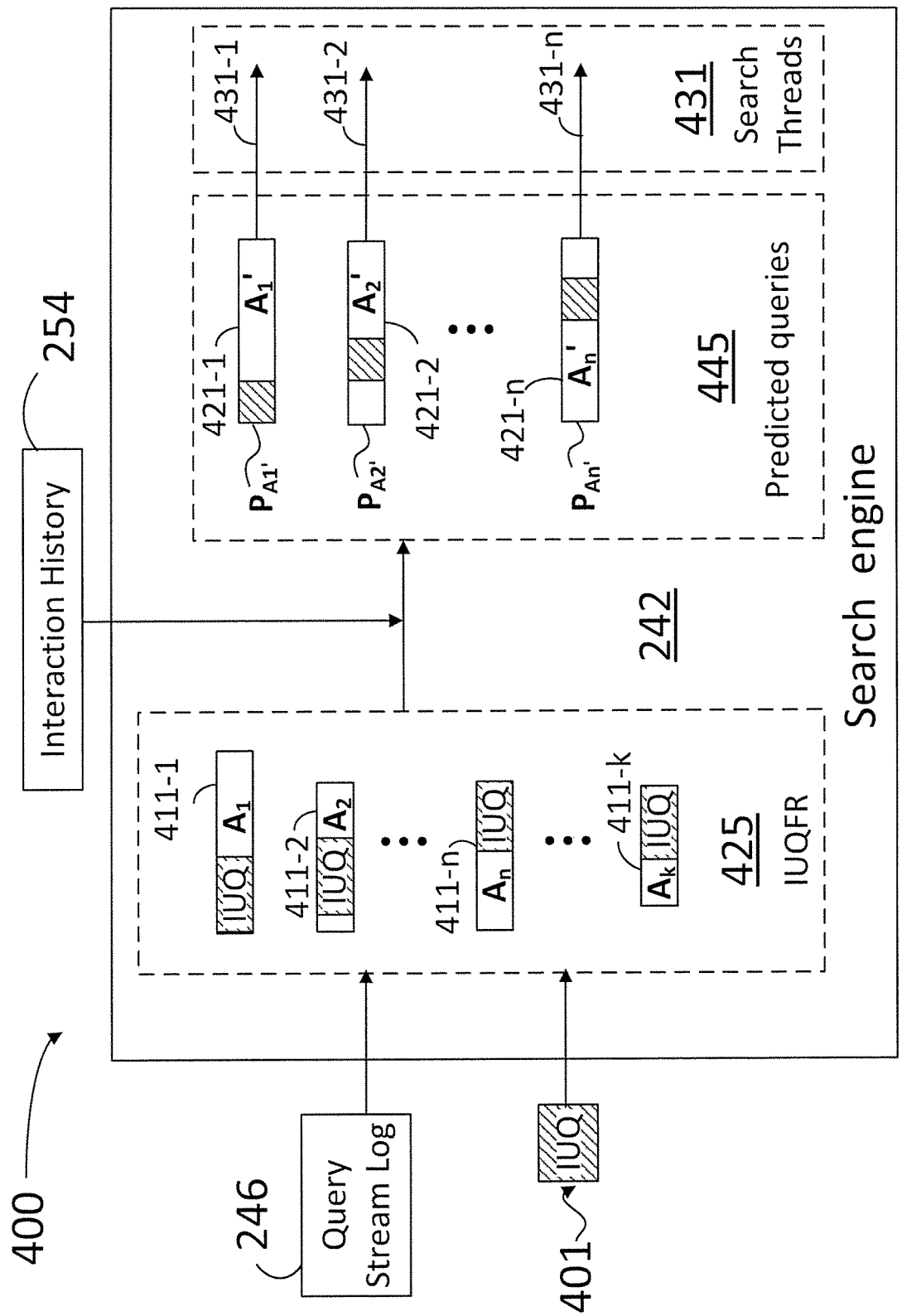
FIG. 4 is a block diagram illustrating a process used to predict a user query based on a first user query and a historical query log.

FIG. 4 is a block diagram illustrating a process 400 used to obtain a set of predicted queries 445 from an IUQ 401 and an interaction history information from interaction history database 254. A user enters an input user query (IUQ) 401 into search engine 242. Search block 242 filters query stream log 246 using IUQ 401 to obtain a plurality of 'k' new queries 411-1 through 411-$n$, and through 411-$k$ (where "n" is an integer less than or equal to "k"). New queries 411-1 through 411-$k$ will be collectively referred to, hereinafter, as "new queries 411." New queries 411 form a set IUQFR 425. New queries 411 are text strings including IUQ in any position within the string and an additional text string. New queries 411 are semantically meaningful expressions in the chosen language for search engine 242. For example, new query 411-1 is a text string starting with IUQ 401 and ending with a string "$A_1$," and new query 411-2 is a text string starting with a portion of string "$A_2$," followed by IUQ 401, and ending with the remaining portion of string "$A_2$."

Historical query information from interaction history 254 is used to determine, for each of new queries 411-$i$ (where "i" is an integer between 1 and "k") including strings "$A_i$," a probability ("$PA_i$") indicating the frequency of past usage of new query 411-$i$. Processor 236 then sorts new queries 411 according to decreasing order of probability. Furthermore, processor 236 forms a set 445 of predicted queries 421-1 through 421-$n$ by selecting the n new queries 411 having the highest values of PAi (where i is less than or equal to n). Hereinafter, predicted queries 421-1 through 421-$n$ will be collectively referred to as predicted queries 421. For each of the n predicted queries 421, the system determines the terms "$A'_i$," which may include portions before or after IUQ 401, or a combination. Note that predicted queries 421 (and terms Ai) are a re-ordered subset of new queries 411 (and terms "A'i").

Processor 236 then forms a search thread 431-$i$ for each of predicted queries 421-$i$ (where i is an integer between 1 and n). Search threads 431-1 through 431-$n$ will be collectively referred to hereinafter as "search threads 431." Search engine 242 then performs a search of image metadata database 252 for each of search threads 431. Without limitation, it is expected that the sets of images found by search engine 242 for each of search threads 431 will be a subset of the images found by search engine 242 applied to only IUQ 401. For example, the image results for the query "woman in red dress" (e.g., a predicted query 421-$i$) are expected to form a subset of the image results for the query "woman in dress" (e.g., IUQ). A set of image results for each search thread 431-$i$ may be sorted according to a relevance of each of the images in the set of image results to the predicted query 421-$i$. In some embodiments, search threads 431 can be performed simultaneously or almost simultaneously because it is expected that the sets of image results may be non-overlapping subsets of the set of image results for IUQ 401.

In an exemplary embodiment, a user issues a query for "New York" (IUQ), which the web application passes to the search engine. The search engine would find all of the items (i.e. images from image metadata database 252) relevant for "New York" (IUQFR 425), store those in memory 232, then sort them by relevance to the query. In a separate thread or process, the search system uses historical behavioral data to predict the queries containing "New York" that are likely to be issued next, such as "New York City", "New York State", "New York skyline", "New York taxi", and the like. Any query not containing the terms "New" and "York" may not be returned by the prediction process. Because items relevant to the predicted queries are also relevant to the query "New York," the search system can use UIQFR 425 instead of re-filtering for "New" and "York," separately. For each predicted query, the system will create a new search thread which will determine the additional terms (e.g., all terms that are not "New" and "York"), retrieve UIQFR 425, filter image metadata database 252 for the additional term(s), and sort the further filtered requests. The results of each of these predicted query retrievals as well as the results for the retrieval of the UIQ are joined in a single set of result sets: one set for each of "New York, "New York City", "New York State", "New York skyline", "New York taxi", and the like. The set of result sets is returned to a results panel in the user interface. The user interface displays these results to the user in a predefined manner (multiple results, hover, textbox suggestions, etc.)

In some embodiments a search system can filter by a multi-step process, where each step filters out a single term within the query. This strategy can be used to expand the scope predicted queries by storing in IUQFR 425 the results of all the intermediate steps in filtering in addition to the final filtered results for the original user query. This modification expands the scope of predicted queries to those that contain all the terms in any of the intermediate steps. Then, for each predicted query, further filtering is performed against the results of the step that filtered the most results and contains only terms that are in the predicted query. As an example, if the user searches for "New York City", and the terms are filtered in the order "York", "New", "city", the search engine will have the intermediate steps [["York"], ["York", "New"], ["York", "New", "city"]]. This allows the system to include predictions such as "New York skyline". For "New York skyline" the filtering step will use the results of ["York", "New"] as a starting point and further filter on "skyline." Accordingly, the additional memory overhead and the added computation for determining for each predicted query what is the largest initial filter step is compensated by a much larger scope of the image search results. Furthermore, a minimum threshold for the number of filtered documents may need to be applied to maintain the efficiency provided by our disclosure.

Figure 5:
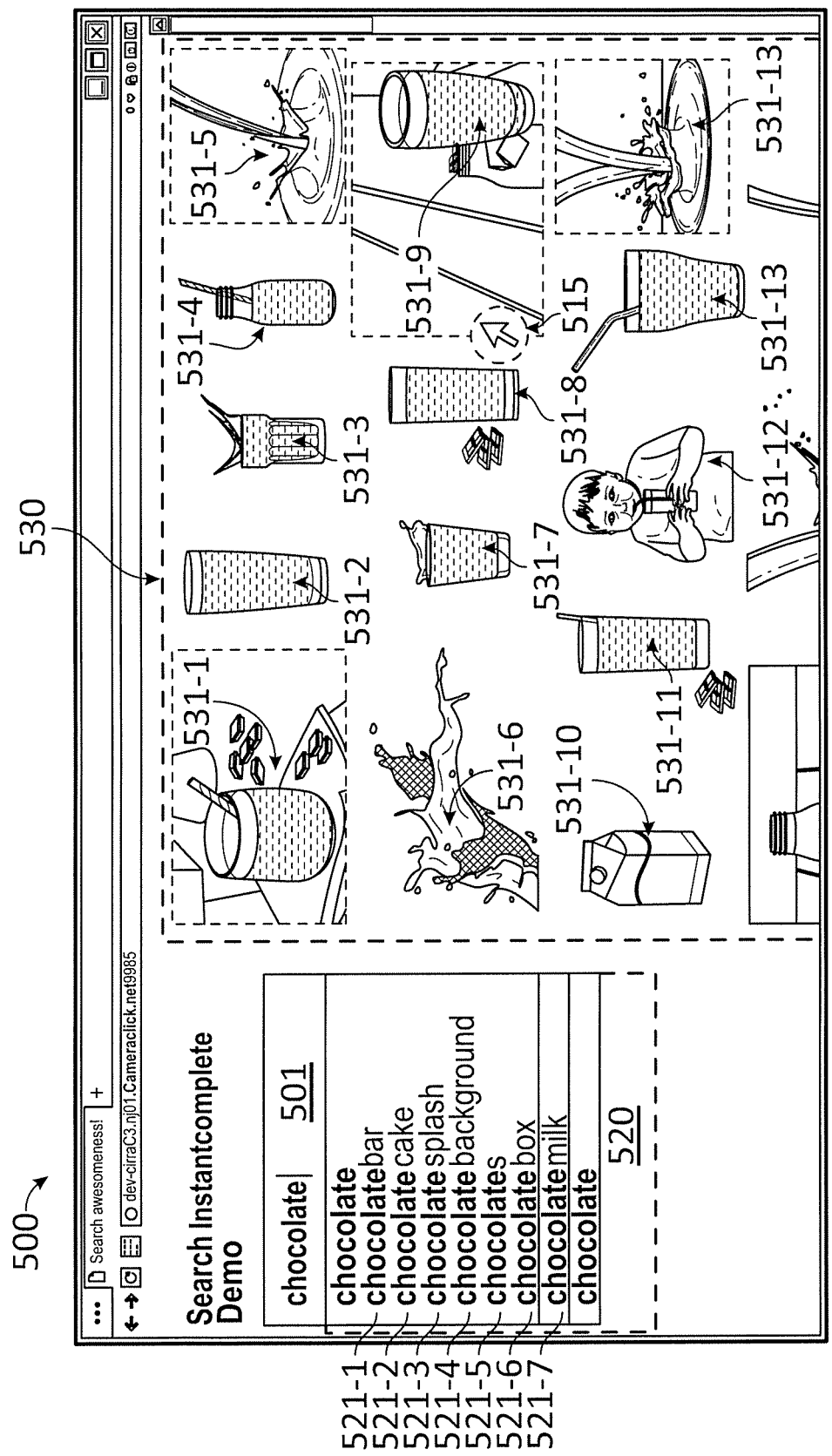
FIG. 5 illustrates an exemplary user interface of a search engine consistent with the present disclosure.

FIG. 5 illustrates an exemplary user interface 500 of a search engine consistent with the present disclosure. The user enters an IUQ into a search field 501 (e.g., "chocolate"). User interface 500 displays a pull-down menu 510 listing a plurality of predicted queries 521-1 ("chocolate bar"), 521-2 ("chocolate cake"), 521-3 ("chocolate splash"), 521-4 ("chocolate background"), 521-5 ("chocolates"), 521-6 ("chocolate box"), and 521-7 ("chocolate milk"), and the like (collectively referred hereinafter as "predicted queries 521").

A results panel 530 includes a plurality of thumbnails for result images 531-1 through 531-13 (collectively referred to, hereinafter, as result images 531). The user may then direct a pointing device 515 to each of result images 531 to inspect, enlarge, edit, and/or download.

Figure 6:
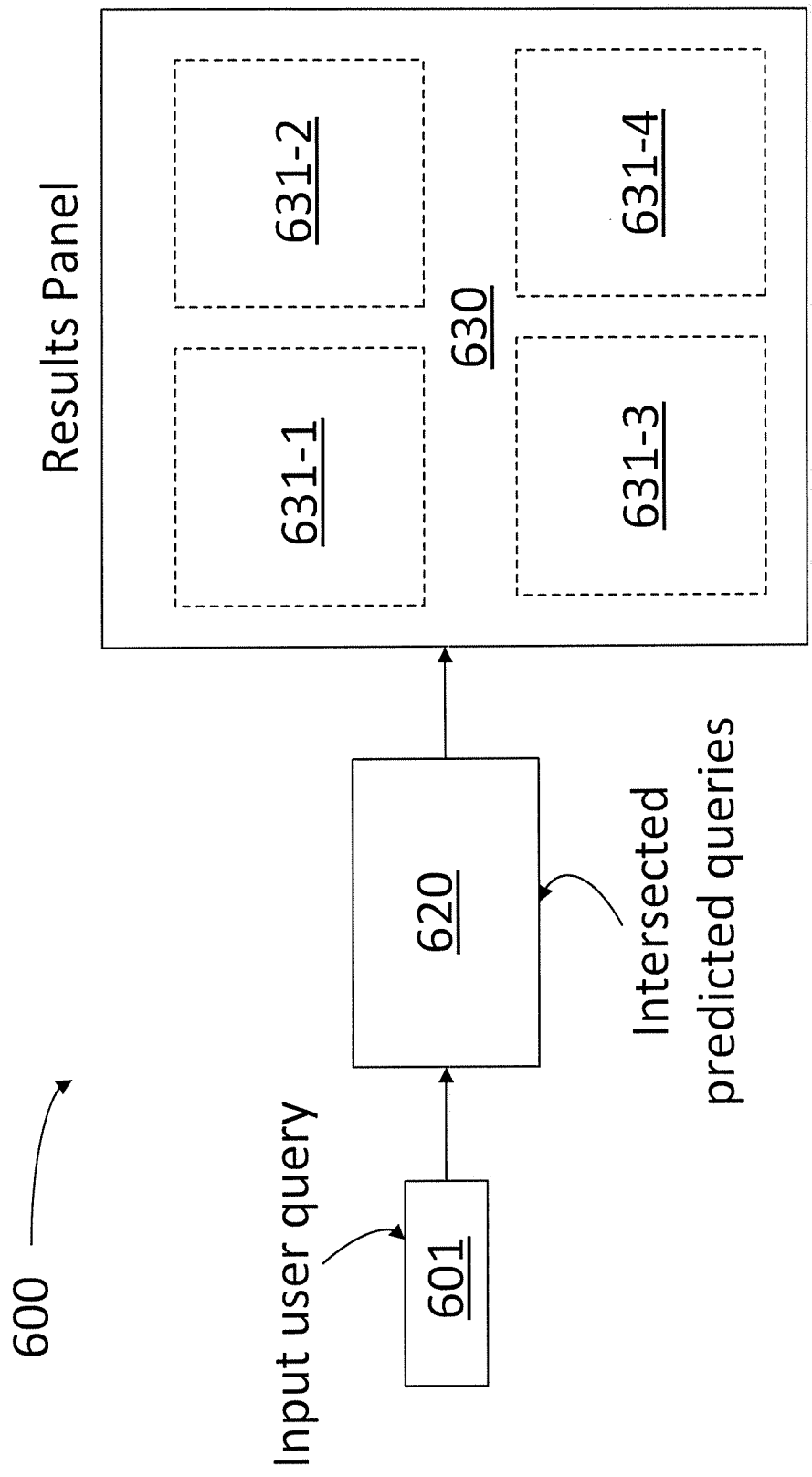
FIG. 6 is a walk-through illustration for searching an image based on a predicted user query from a first user query and a historical query log, according to some embodiments.

FIG. 6 is a walk-through illustration for searching an image based on a predicted user query from a first user query and a historical query log, according to some embodiments. The user enters an input user query 601 and server 130 provides a plurality of intersected predicted queries 620 that the user may select, or modify before activating the search command. When a first search is complete, the server provides a results panel 630 including a plurality of result sets 631-1, 631-2, 631-3, and 631-4 (hereinafter, collectively referred to as result sets 631). Each of result sets 631 includes a plurality of thumbnails corresponding to images retrieved by the search engine based on one of the intersected predicted queries.

In some embodiments, the images in each of result sets 621 are different, which means that the search engine has extended the search scope efficiently, thus providing a wider and more relevant range of options to the user.

Figure 7:
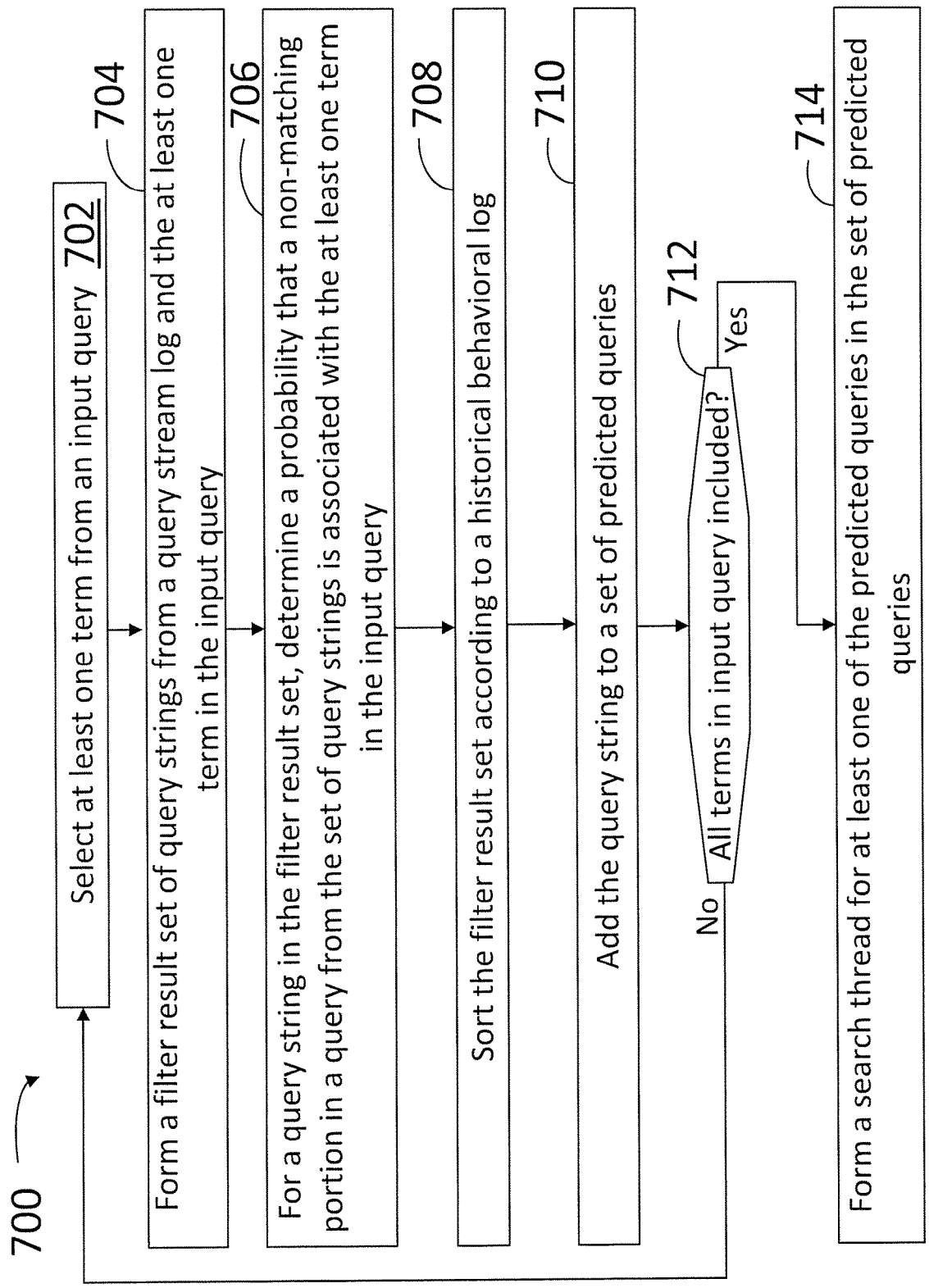
FIG. 7 is a flow chart illustrating steps in a method to predict a user query based on a first user query and a historical query log.

FIG. 7 is a flow chart illustrating steps in a method 700 to predict a user query based on a first user query and a historical query log. Method 700 may be performed at least partially by any one of network servers hosting a collection of images, videos, and multimedia files (e.g., images and video clips), while communicating with any one of a plurality of client devices (e.g., any one of servers 130 and any one of clients 110). The client devices may be handled by a user, wherein the user may be registered to a private account with the server, or may be a visitor to the server website or logged in a server application installed in the client device. At least some of the steps in method 700 may be performed by a computer having a processor executing commands stored in a memory of the computer (e.g., processors 212 and 236, memories 220 and 232). Further, steps as disclosed in method 700 may include retrieving, editing, and/or storing files in a database that is part of, or is communicably coupled to, the computer, using, inter-alia, an image search engine (e.g., image search engine 242). The database may include any one of an image metadata database and an interaction history database (e.g., image database 252 and interaction history database 254). Methods consistent with the present disclosure may include at least some, but not all of the steps illustrated in method 700, performed in a different sequence. Furthermore, methods consistent with the present disclosure may include at least two or more steps as in method 700 performed overlapping in time, or almost simultaneously.

Step 702 includes selecting at least one term from an input query. Step 704 includes forming a filter result set of query strings from a query stream log and the at least one term in the input query.

Step 706 includes, for a query string in the filter result set, determining a probability that a non-matching portion in a query string from the set of query strings is associated with the at least one term in the input query.

Step 708 includes sorting the filter result set according to a historical behavioral log. In some embodiments, step 708 includes determining a score for each item in the filter result set according to a frequency of appearance of the item in the historical behavioral log. Moreover, the historical behavioral log may include data for a specific user, or aggregated data for multiple users.

Step 710 includes adding the query string to a set of predicted queries. In some embodiments, step 710 may include performing a permutation of the order of the terms in the query string to find the permutation that has the potential for a larger results set for the search.

Step 712 includes verifying whether most or all the terms have been included in the query string.

When all terms in the input query have been included in the query string, in some embodiments step 714 includes forming a search thread for at least one of the predicted queries in the set of predicted queries.

Figure 8:
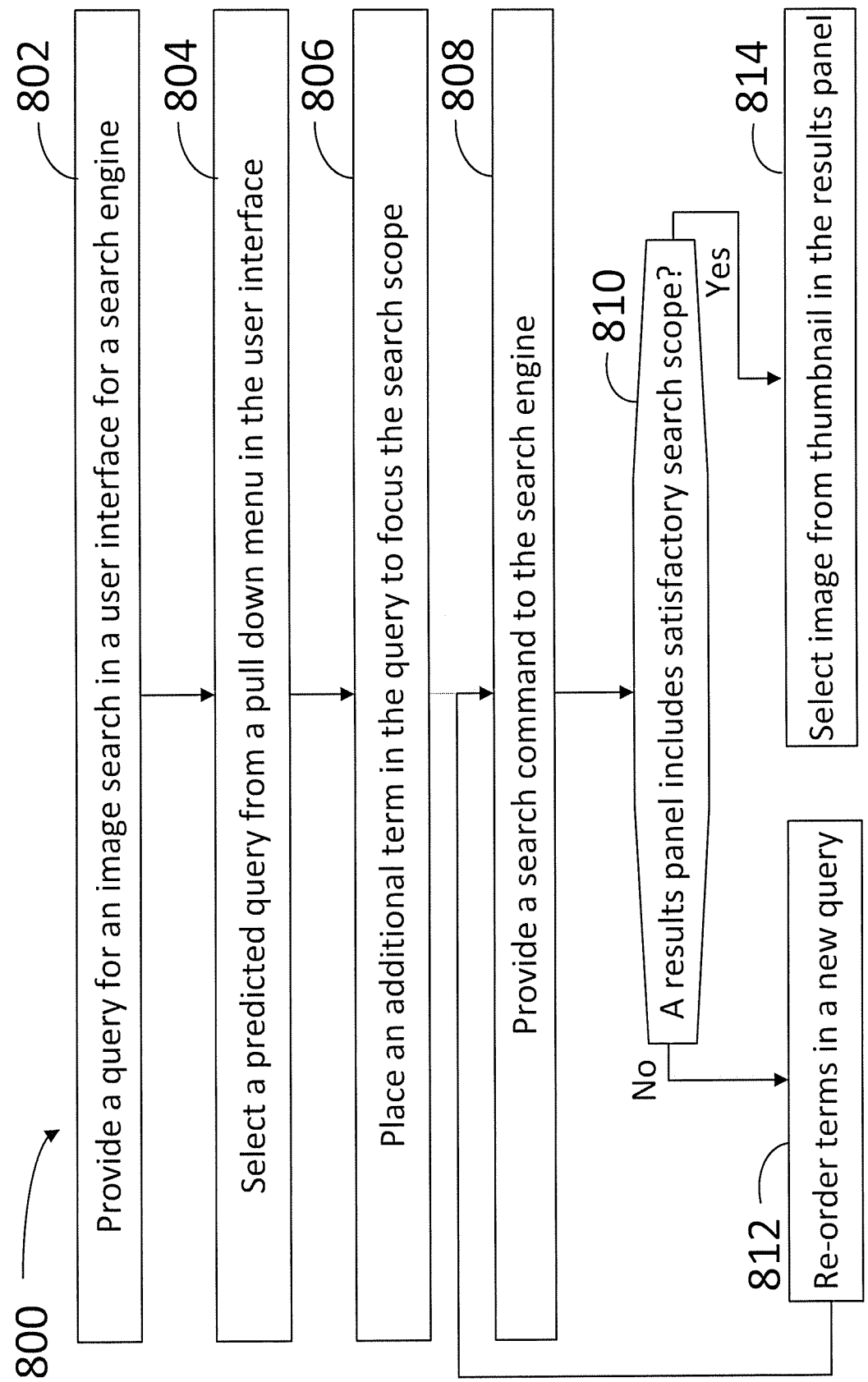
FIG. 8 is a flow chart illustrating steps in a method to select a predicted user query provided to a client device through a user interface.

FIG. 8 is a flow chart illustrating steps in a method to select a predicted user query provided to a client device through a user interface. Method 800 may be performed at least partially by any one of network servers hosting a collection of images, videos, and multimedia files (e.g., images and video clips), while communicating with any one of a plurality of client devices (e.g., any one of servers 130 and any one of clients 110). The client devices may be handled by a user, wherein the user may be registered to a private account with the server, or may be a visitor to the server website or logged in a server application installed in the client device. At least some of the steps in method 800 may be performed by a computer having a processor executing commands stored in a memory of the computer (e.g., processors 212 and 236, memories 220 and 232). Further, steps as disclosed in method 800 may include retrieving, editing, and/or storing files in a database that is part of, or is communicably coupled to, the computer, using, inter-alia, an image search engine (e.g., image search engine 242). The database may include any one of an image database, an interaction history database, a training database, or an annotated training database (e.g., image database 252 and interaction history database 254). Methods consistent with the present disclosure may include at least some, but not all of the steps illustrated in method 800, performed in a different sequence. Furthermore, methods consistent with the present disclosure may include at least two or more steps as in method 800 performed overlapping in time, or almost simultaneously.

Step 802 includes providing a query for an image search in a user interface for a search engine. Step 804 includes selecting a predicted query form a pull down menu in the user interface. In some embodiments, step 804 includes directing a pointing device to the predicted query in the pull down menu and activating the selection with the pointing device.

Step 806 includes placing an additional term in the query, to focus the search scope. In some embodiments, step 806 includes appending a term that is not included in the predicted query from the pull down menu to the predicted query. Step 808 includes providing a search command to the search engine. Step 810 includes verifying that a results panel includes a satisfactory search scope.

When the results panel does not include a satisfactory search scope in step 810, step 812 includes re-ordering terms in a new query and repeating steps 808 through 810. When the results panel includes a satisfactory search scope in step 810, step 814 includes selecting an image from a thumbnail in the results panel.

Hardware Overview

Figure 9:
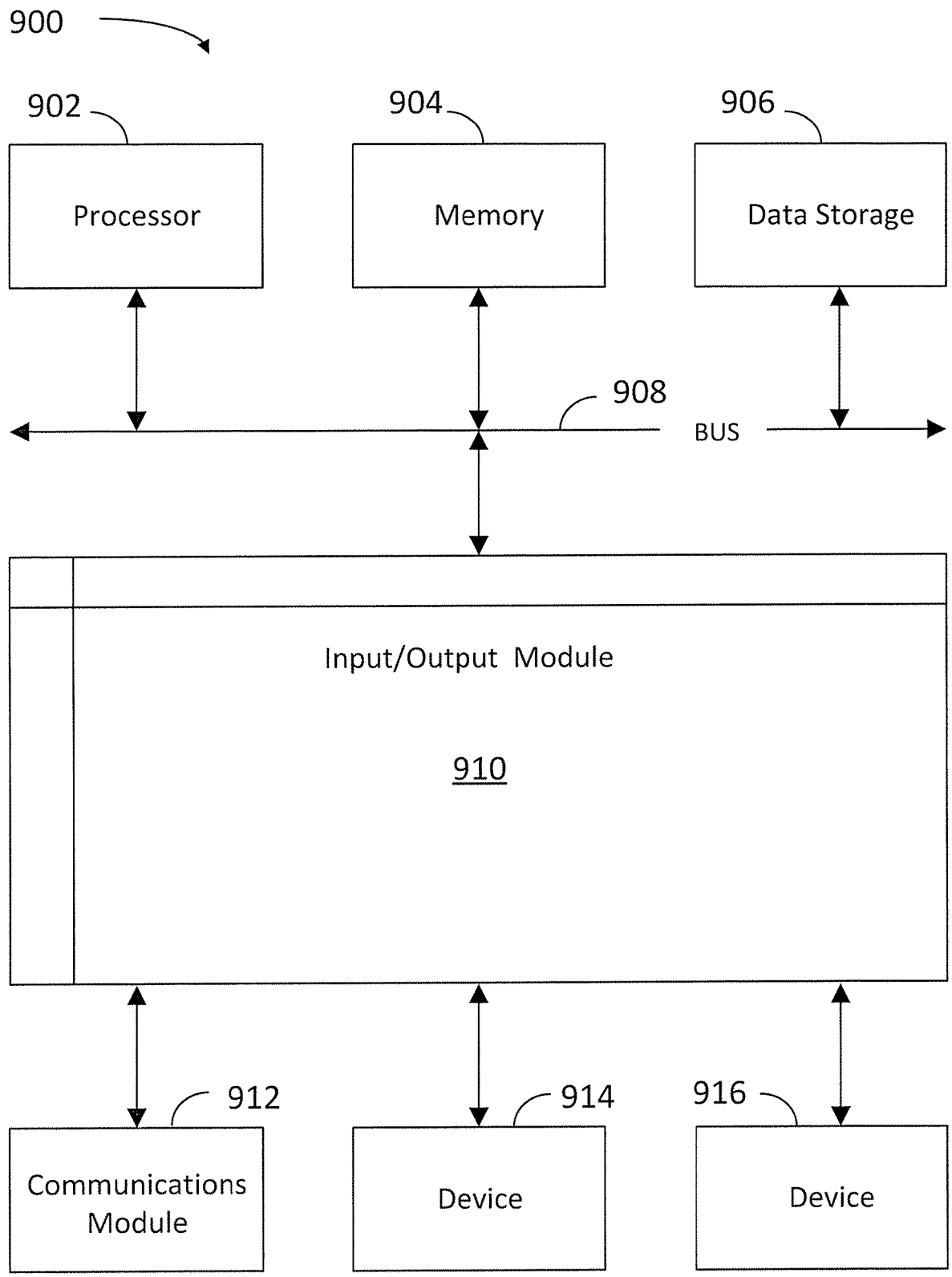
FIG. 9 is a block diagram illustrating an example computer system with which the client and server of FIG. 2 and the methods of FIGS. 3-8 can be implemented.

FIG. 9 is a block diagram illustrating an exemplary computer system 900 with which the client 110 and server 130 of FIG. 1 can be implemented. In certain aspects, the computer system 900 may be implemented using hardware or a combination of software and hardware, either in a dedicated server, or integrated into another entity, or distributed across multiple entities.

Computer system 900 (e.g., client 110 and server 130) includes a bus 908 or other communication mechanism for communicating information, and a processor 902 (e.g., processors 212 and 236) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 218 and 238) include networking interface cards, such as Ethernet cards and modems. In certain aspects, input/output module 910 is configured to connect to a plurality of devices, such as an input device 914 (e.g., input device 214) and/or an output device 916 (e.g., output device 216). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as a LCD (liquid crystal display) monitor, for displaying information to the user.

According to one aspect of the present disclosure, the client 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   receiving a first user query from a user for searching for an item in an item database;
   forming a first filter based on the first user query;
   forming a first filtered item collection comprising a plurality of items from the item database;
   forming a new query with the first user query and at least one term from a historical query log;
   re-ordering a plurality of terms in the new query according to an expected scope of search results for a permutated new query;
   forming a second filter for the new query;
   applying the second filter to the first filtered item collection to form a second filtered item collection;
   associating an item score to each of a plurality of items in the first filtered item collection and in the second filtered item collection;
   sorting the plurality of items in the first filtered item collection and in the second filtered item collection according to the item score associated to each of the plurality of items; and
   providing, for display to a user in a results panel, at least one item from the plurality of items in the first filtered item collection and in the second filtered item collection.

2. The method of claim 1, wherein forming the first filtered item collection comprises applying the first filter to a plurality of image files stored in an image database.

3. The method of claim 1, wherein predicting a new query based on the first user query and a historical query log comprises matching at least a portion of the new query with at least a portion of the first user query and a portion of a query from the historical query log.

4. The method of claim 1, wherein predicting a new query based on the first user query and the historical query log comprises:
   forming a third filter for the new query; and forming a third filtered item collection by applying the third filter to the first filtered item collection, wherein the third filtered item collection and the second filtered item collection do not overlap.

5. The method of claim 1, wherein forming the second filtered item collection comprises applying the second filter to the first filtered item collection.

6. The method of claim 1, wherein associating an item score to one of a plurality of items in the first filtered item collection and a plurality of items in the second filtered item collection comprises associating a probability with the one of the plurality of items for which a user clicks on a thumbnail associated with the one of the plurality of items, based on an interaction history information and a relevance feedback information.

7. The method of claim 1, wherein associating an item score to each of a plurality of items in the first filtered item collection and in the second filtered item collection comprises finding a correlation between the first user query and interaction history information associated with the user.

8. The method of claim 1, wherein associating an item score to each of a plurality of items in the first filtered item collection and in the second filtered item collection comprises finding a correlation between the first user query and object recognition information associated with each of the plurality of items and associating a higher item score for a higher correlation between the first user query and object recognition information.

9. A system comprising:
one or more processors to:
receive a first user query from a user for searching for an item in an item database;
form a first filter based on the first user query;
form a first filtered item collection comprising a plurality of items from the item database;
determine a probability that a non-matching portion is associated with at least one term from the first user query for a predicted query string in a second filter;
sort the plurality of items in the first filtered item collection and in a second filtered item collection according to an interaction history information;
add the predicted query string to a plurality of predicted queries;
form a second filter for a new query;
apply the second filter to the first filtered item collection to form a second filtered item collection;
associate an item score to each of a plurality of items in the first filtered item collection and in the second filtered item collection;
sort the plurality of items in the first filtered item collection and in the second filtered item collection according to the item score associated to each of the plurality of items; and
provide, for display to a user in a results panel, at least one item from the plurality of items in the first filtered item collection and in the second filtered item collection.

10. The system of claim 9, wherein the one or more processors further select at least one term from the first user query, and to form the first filter based on the first user query, based on a predicted query string from a query stream log and the at least one term from the first user query.

11. The system of claim 9, wherein the one or more processors form an item search thread for the new query.

12. The system of claim 9, wherein to predict a new query based on the first user query and a historical query log, the one or more processors further re-order a plurality of terms in the new query according to an expected scope of search results for the new query.

13. The system of claim 9, wherein to predict a new query based on the first user query and a historical query log the one or more processors match at least a portion of the new query with at least a portion of the first user query and a portion of a query from the historical query log.

14. The system of claim 9, wherein the one or more processors further display a pull-down menu for a user that includes the new query.

15. The system of claim 9, wherein to predict a new query based on the first user query and a historical query log the one or more processors:
form the new query with the first user query and at least one term from the historical query log; and
re-order a plurality of terms in the new query according to an expected scope of search results for a permutated new query.

16. The system of claim 9, wherein to predict a new query based on the first user query and a historical query log the one or more processors:
form a third filter for the new query; and
form a third filtered item collection by applying the third filter to the first filtered item collection, wherein the third filtered item collection and the second filtered item collection do not overlap.

17. The system of claim 9, wherein to form the second filtered item collection the one or more processors apply the second filter to the first filtered item collection.

18. A non-transitory, computer-readable medium storing instructions which, when executed by a processor, cause a computer to perform a method, the method comprising:
receiving a first user query from a user for searching for an item in an item database;
forming a first filter based on the first user query;
forming a first filtered item collection comprising a plurality of items from the item database;
forming a new query with the first user query and at least one term from a historical query log;
re-ordering a plurality of terms in the new query according to an expected scope of search results for a permutated, new query;
forming a second filter for the new query;
applying the second filter to the first filtered item collection to form a second filtered item collection;
associating an item score to each of a plurality of items in the first filtered item collection and in the second filtered item collection;
sorting the plurality of items in the first filtered item collection and in the second filtered item collection according to the item score associated to each of the plurality of items; and
providing, for display to a user in a results panel, at least one item from the plurality of items in the first filtered item collection and in the second filtered item collection.

19. The non-transitory, computer-readable medium of claim 18, wherein in the method, forming the first filtered item collection comprises applying the first filter to a plurality of image files stored in an image database.

20. The non-transitory, computer-readable medium of claim 18, wherein in the method, predicting a new query based on the first user query and a historical query log comprises matching at least a portion of the new query with at least a portion of the first user query and a portion of a query from the historical query log.

\* \* \* \* \*